United States Patent [19]

Knapp et al.

[11] Patent Number: 4,709,337

[45] Date of Patent: Nov. 24, 1987

[54] VEHICLE ASSEMBLY METHOD

[75] Inventors: George P. Knapp, Washington; Bobby W. Higgins, Fraser; Durward W. Roller, Romeo, all of Mich.

[73] Assignee: Chrysler Motors Corporation, Highland Park, Mich.

[21] Appl. No.: 826,647

[22] Filed: Feb. 6, 1986

[51] Int. Cl.$^4$ .............................................. G06F 15/46
[52] U.S. Cl. ................... 364/468; 29/33 P; 364/188; 364/552
[58] Field of Search ............... 364/468, 478, 474, 475, 364/424, 425, 552, 167–171, 188, 189; 29/428–431, 33 P, 564, 564.1; 235/375, 385; 414/134–136

[56] References Cited

U.S. PATENT DOCUMENTS

| | | | |
|---|---|---|---|
| 4,237,598 | 12/1980 | Williamson | 364/474 X |
| 4,251,858 | 2/1981 | Cambigue et al. | 364/474 |
| 4,309,600 | 1/1982 | Perry et al. | 364/468 X |
| 4,332,012 | 5/1982 | Sekine et al. | 364/468 |
| 4,472,783 | 9/1984 | Johnstone et al. | 364/468 X |
| 4,561,060 | 12/1985 | Hemond | 364/468 X |

Primary Examiner—Joseph Ruggiero
Attorney, Agent, or Firm—Edward A. Craig

[57] ABSTRACT

A method of quality assurance and rectification of defects in the process of assembling a vehicle on a continuously moving assembly line is provided. The method involves utilization of groups of assembly stations along the lengths of the assembly line interspersed with upgrade stations. Information is communicated from the assembly stations to a central computer and then to the upgrade stations to assure that quality is maintained and defects are rectified.

3 Claims, 5 Drawing Figures

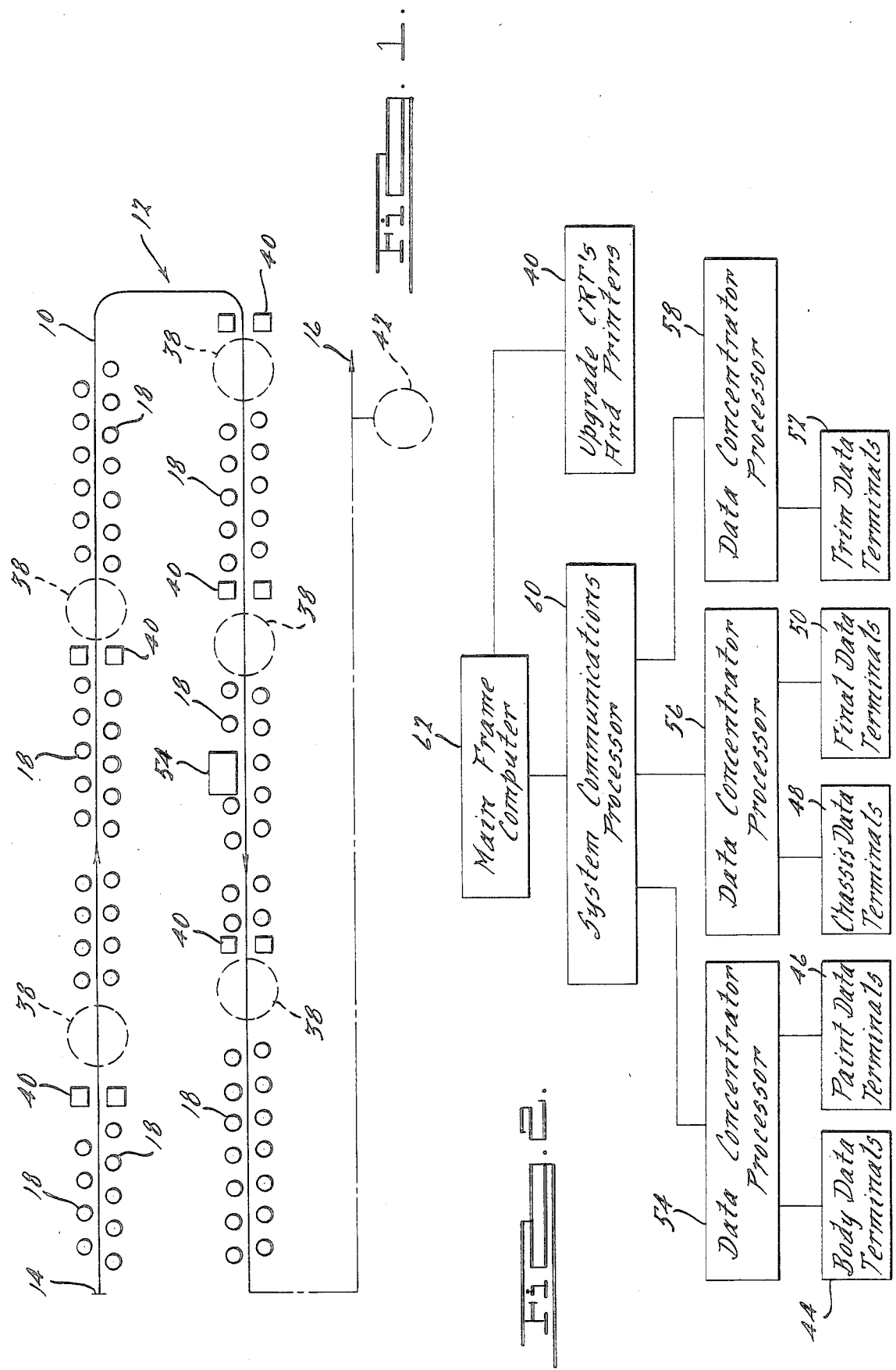

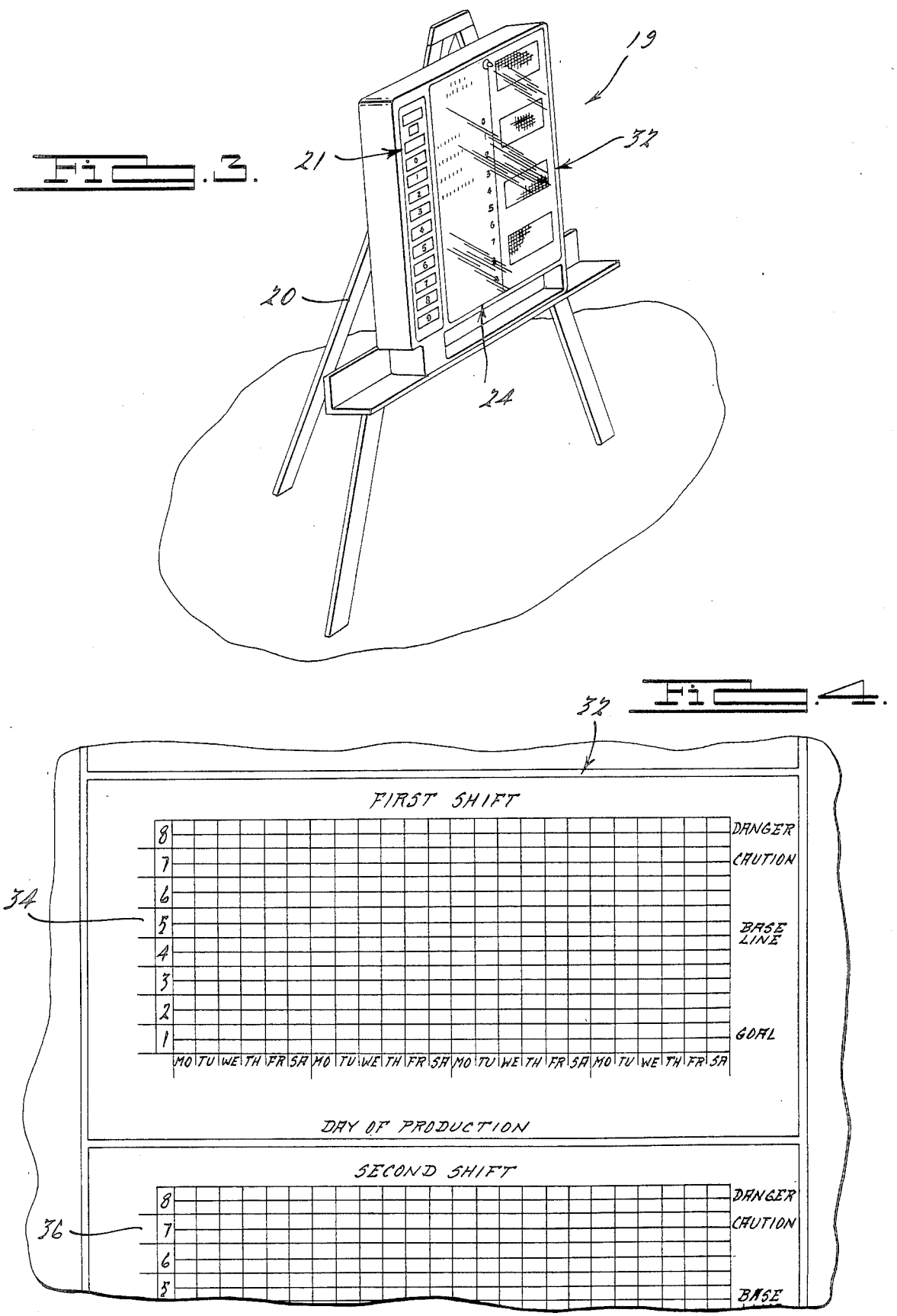

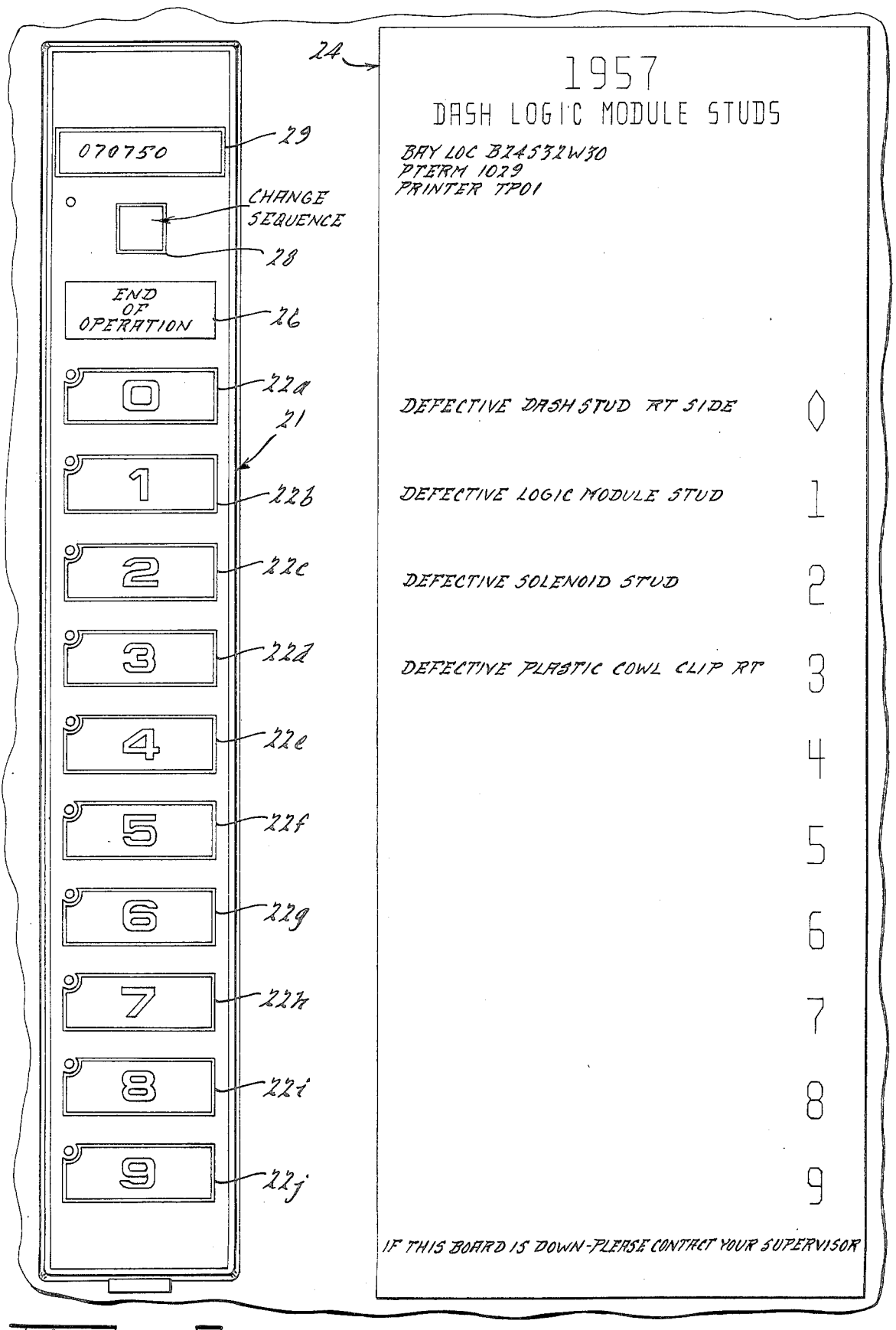

VEHICLE ASSEMBLY METHOD

BACKGROUND OF THE INVENTION

1. Field of the invention

This invention relates to a method for assembling a vehicle on a continuously moving assembly line.

2. Prior Art

Manufacturers of mass-produced vehicles, both cars and light trucks, constantly strive to reduce the cost of manufacture while at the same time increase the quality of the product. The increased complexity of vehicles has made this job more difficult than it was in the past. The accepted practice for mass producing vehicles is to use a continuously moving assembly line attended by operators each of whom is assigned a specific task or tasks to complete on each vehicle.

The fact that the assembly line does move continuously frequently prevents an operator from rectifying an unsuccessfully completed task. Unsuccessful completion of a task may be due to numerous factors, many of which are beyond the control of the operator. A screw may be improperly formed, there may be misalignment of openings and many similar misadventures which are inherent in the building of any product. However, there is frequently not time for an operator to correct a defect before a vehicle moves past him on the assembly line. Sometimes an operator may not be able to complete an operation at all before the vehicle moves by him. For example, he may run out of a part or his tools may not operate correctly. On other occasions, one of the tasks of an operator may be to check the operational characteristics of a group of connected tasks that were completed earlier, the totality of which may not operate correctly. An opertor's task may be simply to determine whether or not prior task completions have been effectively accomplished.

In the past, various efforts have been made to cope with the above-discussed assembly problems. Such coping has frequently taken the form of manually noting such conditions and passing this information on to repair people. It has been difficult to provide space to accommodate repair personnel while at the same time continuing to perform assembly operations. Quite often, it has been necessary to remove a vehicle from the continuously moving assembly line, either at the end of assembly opertions or at some intermediate point, and transport it to a station where correction of defects is made. Obviously, such a procedure is inherently inefficient and may not result in discovery and correction of all defects.

In accordance with the present invention, a method is provided for assembling a vehicle on a continuously moving assembly line wherein the operators communicate information to a central computer concerning successful or unsuccessfuly completion of tasks. This information is retrieved by other operators located along the continuously moving assembly line whose responsibility it is to cure any defects which occur. These operators have information readily available to them via the central computer to give them a running knowledge of the condition of each partially assembled vehcile which passes by them. The net result is improved vehicle quality while at the same time maintaining efficient assembly of vehicles.

SUMMARY OF THE INVENTION

A method of quality assurance and rectification of defects in the process of assembling on a continuously moving assembly line is provided. The method includes the steps of providing a continuously moving assembly line for assembly of vehicles, providing assembly stations along the length of the continuously moving assembly line attended by operators who perform discrete assigned tasks on incomplete vehicles positioned on the continuously moving assembly line as the incomplete vehicles pass by leading to building of complete vehicles. The method further comprises providing an assembly data input terminal adjacent to each assembly station, with each data input terminal having a plurality of manually actuatable switches each corresponding to a discrete assigned task of an operator. The operators manipulate the switches to indicate successful or unsuccessful completion of discrete assigned tasks with respect to a specific incomplete vehicle. This information is communicated to a central computer.

Upgrade stations are provided at spaced locations between groups of assembly stations along the length of the continuously moving assembly line. The upgrade stations are attended by operators. Upgrade data output/input terminals are provided at the upgrade stations. These terminals communicate with the central computer. The operators at the upgrade stations receive information at the upgrade data output/input terminals from the central computer with respect to specific incomplete vehicles concerning preceding unsuccessful task completion and rectify preceding unsuccessful tasks as the incomplete vehicles pass by. The consequences of the actions of the upgrade operators are communicated back to the central computer via the upgrade data output/input terminals.

A manually actuatable task complete switch is provided on each assembly data input terminal. When this switch is actuated it indicates to the central computer that all discrete assigned tasks at the associated work station with respect to a specific incomplete vehicle have been completed regardless of whether or not the tasks have been successfully or unsuccessfully completed. The task completion switch is manipulated at the appropriate time by an operator at an assembly station if all discrete assigned tasks on a specific incomplete vehicle have been completed and this information is communicated to the central computer. Operators receive this information at upgrade station output/input terminals from the central computer and subsequently inspect each incomplete vehicle in connection with which the task complete switch has not been actuated to determine which if any assigned tasks have not been completed. The operators at the upgrade stations then complete any assigned task which has not previously been completed at an assembly station as incomplete vehicles pass by and the fact of task completion is relayed to the central computer.

A closed loop continuously moving assembly line segment is provided at the end of the assembly line attended by upgrade operators. Any incomplete vehicles which include any unsuccessfully completed task which time or conditions did not permit to be rectified earlier are shunted onto the closed loop segment and the operators rectify any such preceding unsuccessfully assigned task as incomplete vehicles pass by. The vehicles are removed from the closed loop segment when all unsuccessfully assigned tasks which can be successfully completed have been successfully completed.

BRIEF DESCRIPTION OF THE DRAWINGS

FIG. 1 is a schematic view of a continuously moving assembly line where the method of the present invention is employed;

FIG. 2 is a block diagram of the information system employed in the method of the present invention;

FIG. 3 is a view in perspective of an assembly data input terminal which is provided adjacent to each assembly station on the continuously moving assembly line;

FIG. 4 is a view of a portion of the graphical display system used on the assembly data input terminal of FIG. 3 indicating daily progress; and FIG. 5 is a view of the manually actuatable switch bank provided for the assembly operators on each of the data input terminals with a discrete assigned task display situated next to the switch bank with each assigned task positioned in alignment with a switch which corresponds to the assigned task.

BRIEF DESCRIPTION OF A PREFERRED EMBODIMENT

Referring to FIG. 1, it will be noted that one U-shaped segment 10 of a continuously moving assembly line 12 is illustrated in solid lines. The assembly line 12 is, of course, much more extensive than the illustrated segment to facilitate assembly of a complete vehicle. The remaining portions of the assembly line 12 are illustrated in dotted line. The assembly line begins at point 14 and ends at arrowhead 16. In modern assembly plants, the assembly line takes the form of a moving track in the floor. Incomplete vehicles ride on the track past various assembly stations. As will be noted, the assembly stations 18, which may be located on both sides of the assembly line, are illustrated by small circles. The assembly stations are provided along the length of the continuously moving assembly line and are attended by operators each of whom performs discrete assigned tasks on incomplete vehicles positioned on the continuously moving assembly line as the incomplete vehicles pass by. This leads to building of complete vehicles.

An assembly data input terminal 19 is provided at each assembly station. The terminals 19 are illustrated in FIGS. 3, 4, and 5. As will be noted, the terminal 19 is mounted on an easel structure 20. This facilitates use by an assembly operator.

As shown in FIG. 5, the terminal 19 includes a vertical switch bank 21 which includes manually actuatable switches 22a–j each of which carries an identifying numeral, illustratively 0–9, and each of which may correspond to a discrete assigned task of an operator. As will be later explained, the terminal 19 is connected to a microprocessor so that the information represented by actuation of one of the switches 22a–j may be conveyed ultimately to a central computer.

A panel 24 is positioned adjacent to the bank of switches 21. The panel 24 has a series of vertical numerals which are in alignment with the similar numerals on the switch bank. These numerals also run from 0–9 in the illustrated example. Only the first four numerals are used in the illustrated case. Numeral 0 indicates a "defective-stud rt. side"; the numeral 1 indicates a "defective logic module stud"; the numeral 2 indicates a "defective solenoid stud"; while the numeral 3 indicates a "defective plastic cowl clip rt." The operator at this station has responsibility for four assigned tasks. If any one of these assigned tasks are not correctly completed, he then actuates the appropriate switch button to indicate that such task has not been correctly completed. If the operator does not actuate a task button, the indication is that the task has been successfully completed. While the switch actuation has been expressed in the negative, it will be appreciated that it could also be expressed in the positive, that is, the operator pushing only those button which indicate successful completion of a task.

The panel 24 also illustratively includes additional information at the top and bottom thereof.

An additional manually actuatable task completion switch 26 is provided immediately above the switches 22a–j. The switch 26, when actuated, indicates to the central computer that all discrete assigned tasks at the associated work station with respect to a specific incomplete vehicle have been completed regardless of whether or not the tasks have been successfully or unsuccessfully completed. This information assures later users of the input data that there is not an assigned task which has not been either successfully or unsuccessfully completed. The switch 26 is labeled "end of operation". If the switch 26 is not actuated at the appropriate time at an assembly station, operators receiving this information at later points, called "upgrade stations" will check each assigned task to be sure that such task has been completed. If such tasks have not been completed, later operators will complete the tasks.

Each vehicle is assigned a production number so that activities with respect thereto may be recorded thereagainst. Each time a vehicle passes an assembly station, the assembly operator actuates another switch 28 located immediately above the switch 26. The switch 28 has printed thereon "change sequence". When this switch is actuated, a new number will appear on the panel 29 immediately above the switch 28 which identifies the next incomplete vehicle; illustratively "070750". All new task completion information will be recorded against this number.

An additional panel 32, partially shown in FIG. 4, is provided on the terminal 19 to one side of the panel 24. The panel 32 carries a series of graphical data indicating the level of effiency of operations at that particular terminal. As will be noted; one set of data 34 is for the first shift while another set 36 is for the second shift. The squares are provided to record weighted unsuccessful production levels. As will be noted on the left, ascending numerals 1–8 are provided. On the right are indications of the level of performance. On top is "Danger", beneath that is "Caution", beneath that is "Base Line", and beneath that is "Goal". On the bottom line are indicated the days of the week, this particular graphical data being designed to cover four weeks. Insertion of this information feeds back to the operator the level of performance at that particular station.

It should be noted that an assembly operator may, in addition to assigned assembly tasks, also perform assigned inspection-type tasks related to operational characteristics of previously performed tasks. These may relate to emission control characteristics, safety related items, or any of the various operative features of the vehicle.

Referring again to FIG. 1, upgrade stations 38 attended by operators are provided at spaced locations between groups of assembly stations along the length of the continuously moving assembly line. Upgrade data-/input terminals 40 are provided at the upgrade stations. These terminals also communicate with the central computer. The terminals 40 may receive or transmit information from the central computer. The terminals 40 include cathode ray tube (CRT) monitors with key boards and may also include printers. Operators at the upgrade stations receive information with respect to specific incomplete vehicles concerning preceding unsuccessful task completion. Operators at the upgrade stations have the responsibility of rectifying preceding unsuccessfully completed tasks as the incomplete vehicles pass by. When unsuccessfully completed tasks have been rectified by the operators at upgrade stations, this information is communicated back to the central computer. It is not always possible for the upgrade stations to successfully complete each unsuccessfully completed preceding task. When this occurs, the incomplete vehicle continues to pass along the assembly line for rectification of the unsuccessfully completed task at a later point in time.

As will be noted in FIG. 1, a final upgrade station 42 is provided adjacent the end of the assembly line. The upgrade station 42 is a close loop continuously moving assembly line segment attended by operators. Any vehicles which include any unsuccessfully completed tasks which time or conditions did not permit to be rectified earlier are shunted onto the station 42 while other vehicles pass for shipping. Vehicles remain on station 42 traveling on the closed loop until the operators rectify any preceding unsuccessfully completed task.

Vehicles are removed from the closed loop segment 42 when all unsuccessfully completed assigned tasks which can be successfully completed have been successfully completed. Occasionally, there will be some tasks which necessitate working on the underside of the vehicle. In such cases, vehicles are removed and placed on hoists for completion of any remaining unsuccessfully completed tasks.

As will be appreciated, unsuccessfully completed tasks do not necessarily have to be completed at a particular upgrade station. Successive upgrade stations may complete unsuccessfully completed tasks from any preceding station as time and conditions permit.

FIG. 2 illustrates in block diagram form the information processing system provided for the method. As will be noted, the assembly operation is divided into five segments at the bottom of the diagram. One block 44 represents all of the terminals 19 which relate to "body data"; the second block 46 relates to all of the terminals 19 corresponding to "paint data"; a third block 48 represents all of the terminals 19 associated with "chassis data"; a fourth block 50 represents all of the terminals 19 related to "final data"; and a fifth block 52 represents all of the terminals 19 associated to "trim data". The terminals defined by blocks 44, 46 feed into a first data concentrator processor 54; the terminals defined by blocks 46, 48 feed into a second data concentrator processor 56; while the terminals defined by block 52 feed into a third data concentrator processor 58. Each of the processors, 54, 56, 58 is a microprocessor capable of correlating the data fed thereinto into a form which can be accepted and processed by a systems communications processor 60. The systems communications processor is also a microprocessor. The systems communications processor 60 feeds the correlated information into a main frame computer 62 which has heretofore been referred to as a "central computer". In turn, the computer 62 communicates directly with the upgrade CRT's and printers located at the upgrade stations. The microprocessors and main frame computer are suitably programmed to correlate the data which is handled thereby.

We claim:

1. A method of quality assurance and rectification of defects in the process of assembling a vehicle on a continuously moving assembly line comprising the steps of:
   a. providing a continuously moving assembly line for assembly of vehicles;
   b. providing assembly stations along the length of the continuously moving assembly line attended by operators who perform discrete assigned tasks on incomplete vehicles positioned on the continuously moving assembly line as the incomplete vehicles pass by, leading to building of complete vehicles;
   c. providing an assembly data input terminal at each assembly station, with each data input terminal having a plurality of manually actuatable switches corresponding to a discrete assigned tasks of an operator;
   d. the operators manipulating the switches to indicate successful or unsuccessful completion of discrete assigned tasks with respect to specific incomplete vehicles;
   e. communicating the input data from the assembly data input terminals to a central computer;
   f. providing upgrade stations attended by operators at spaced locations between groups of assembly stations along the length of the continuously moving assembly line;
   g. providing upgrade data output/input terminals at the upgrade stations which communicate with the central computer;
   h. the operators at the upgrade stations receiving information at the upgrade data output/input terminals from the central computer with respect to specific incomplete vehicles concerning preceding unsuccessful task completion and rectifying preceding unsuccessfully completed tasks as the incomplete vehicles pass by; and
   i. communicating information back to the central computer via the upgrade data output/input terminals regarding such rectification.

2. The method as defined in claim 1, further characterized in the steps of:
   a. providing a manually actuatable task completion switch on each assembly data input terminal which, when actuated, indicates to the central computer that all discrete assigned tasks at the associated work station with respect to a specific incomplete vehicle have been completed regardless of whether or not the tasks have been successfully or unsuccessfully completed;
   b. manipulation of the task completion switch at the appropriate time by an operator at an assembly station if all discrete assigned tasks on a specific incomplete vehicle have been completed and communicating this information to the central computer;
   c. operators receiving this information at upgrade station data output/input terminals from the central computer; and
   d. operators subsequently inspecting, at an upgrade station, each incomplete vehicle in connection with which the task completion switch has not been actuated to determine which, if any, assigned tasks have not been completed;

e. operators at upgrade stations then completing any assigned task which has not been previously completed at an assembly station as incomplete vehicles pass by; and f. relaying the fact of completion of any incomplete assigned tasks to the central computer.

3. The method as defined in claim 1, further characterized in the steps of:

a. providing a closed loop continuously moving assembly line segment at the end of the assembly line attended by upgrade operators;

b. shunting any incomplete vehicles onto the closed loop segment which include any unsuccessfully completed tasks which time or conditions did not permit to be rectified earller and the operators rectifying any such preceding unsuccessfully completed assigned tasks as incomplete vehicles pass by; and c. removing vehicles from the closed loop segment when all unsuccessfully completed assigned tasks which can be successfully completed have been successfully completed.

* * * * *